US009823929B2

(12) United States Patent
Streett et al.

(10) Patent No.: US 9,823,929 B2
(45) Date of Patent: Nov. 21, 2017

(54) OPTIMIZING PERFORMANCE FOR CONTEXT-DEPENDENT INSTRUCTIONS

(71) Applicant: QUALCOMM Incorporated, San Diego, CA (US)

(72) Inventors: Daren Eugene Streett, Cary, NC (US); Brian Michael Stempel, Raleigh, NC (US); Thomas Philip Speier, Raleigh, NC (US); Rodney Wayne Smith, Raleigh, NC (US); Michael Scott McIlvaine, Raleigh, NC (US); Kenneth Alan Dockser, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 13/841,576

(22) Filed: Mar. 15, 2013

(65) Prior Publication Data
US 2014/0281405 A1    Sep. 18, 2014

(51) Int. Cl.
*G06F 9/30* (2006.01)
*G06F 9/38* (2006.01)

(52) U.S. Cl.
CPC ...... *G06F 9/30098* (2013.01); *G06F 9/30189* (2013.01); *G06F 9/3842* (2013.01); *G06F 9/3863* (2013.01)

(58) Field of Classification Search
CPC .................. G06F 9/30036; G06F 9/30145
USPC ............................................. 712/7, 220, 222
See application file for complete search history.

(56) References Cited

U.S. PATENT DOCUMENTS

| 6,079,006 A | 6/2000 | Pickett |
| 6,405,305 B1 | 6/2002 | Meier et al. |
| 7,093,111 B2 | 8/2006 | Frommer et al. |
| 7,500,087 B2 | 3/2009 | Saha |

(Continued)

FOREIGN PATENT DOCUMENTS

| CN | 101776989 A | 7/2010 |
| EP | 649086 | 4/1995 |

OTHER PUBLICATIONS

Hennessy & Patterson, "Computer Architecture, A Quantitative Approach". Morgan Kaufmann Publishers, 2007. 4 pages.*

(Continued)

*Primary Examiner* — Andrew Caldwell
*Assistant Examiner* — Michael Metzger
(74) *Attorney, Agent, or Firm* — Muncy, Geissler, Olds & Lowe (57) ABSTRACT

A processor includes a queue for storing instructions processed within the context of a current value of a register field, where for some embodiments the instruction is undefined or defined, depending upon the register field at time of processing. After a write instruction (an instruction that writes to the register field) executes, the queue is searched for any entries that contain instructions that depend upon the executed write instruction. Each such entry stores the value of the register field at the time the instruction in the entry was processed. If such an entry is found in the queue and its stored value of the register field does not match the value that the write instruction wrote to the register field, then the processor flushes the pipeline and restarts at a state so as to correctly execute the instruction.

32 Claims, 4 Drawing Sheets

(56) References Cited

U.S. PATENT DOCUMENTS

| | | | |
|---|---|---|---|
| 2005/0273579 A1* | 12/2005 | Elmer | G06F 9/3855 |
| | | | 712/218 |
| 2009/0158012 A1* | 6/2009 | Hansen | G06F 9/30 |
| | | | 712/222 |
| 2009/0319758 A1* | 12/2009 | Kimura | G06F 9/3851 |
| | | | 712/220 |
| 2010/0205406 A1* | 8/2010 | Hooker | G06F 9/30076 |
| | | | 712/208 |
| 2010/0332790 A1* | 12/2010 | Maruyama | G06F 12/1027 |
| | | | 711/207 |
| 2011/0047358 A1 | 2/2011 | Eichenberger et al. | |
| 2012/0226891 A1 | 9/2012 | Estlick et al. | |

OTHER PUBLICATIONS

International Search Report and Written Opinion—PCT/US2014/029876—ISA/EPO—Jun. 13, 2014.

\* cited by examiner

OPTIMIZING PERFORMANCE FOR CONTEXT-DEPENDENT INSTRUCTIONS

FIELD OF DISCLOSURE

The present invention relates to microprocessors, and more particularly to optimizing performance of microprocessors when processing instructions whose behavior is context-dependent.

BACKGROUND

The instruction sets for some modern microprocessor architectures include instructions whose behavior is context-dependent (for example, floating point vector instructions). A vector instruction (or operation) operates on one or more data vectors to provide a result, where the result may also be a vector. A vector instruction may also be termed a SIMD (Single Instruction Multiple Data) operation.

It is desirable for microprocessors with pipelined and out-of-order execution architectures to implement context-dependent instructions with high performance.

SUMMARY

Embodiments of the invention are directed to systems and methods for optimizing performance for vectored floating point instructions, and more generally for optimizing the performance of instructions dependent upon a write instruction to one or more register fields, where the one or more register fields determine a context for the instruction.

In an embodiment, a method includes processing an instruction within a context determined by a current value of a register field, the instruction dependent upon a write instruction, the write instruction to write a configuration value to the register field, the instruction processed before the write instruction executes; storing the instruction in an entry in a queue; storing in the entry the current value of the register field; searching the queue for the entry after the write instruction executes; and comparing the current value stored in the entry with the configuration value after the write instruction executes.

In another embodiment, a processor includes a register having a field; a queue; a pipeline; and a controller. The controller is configured to cause the pipeline to process an instruction within a context determined by a current value of the register field, where the instruction is dependent upon the write instruction, where the write instruction is to write a configuration value to the register field; store the vector instruction in an entry in the queue; store in the entry the current value of the register field; search the queue for the entry after the pipeline executes the write instruction; and compare the current value stored in the entry with the configuration value after the pipeline executes the write instruction In another embodiment, a method includes means for processing an instruction within a context determined by a current value of a register field, the write instruction to write a configuration value to the register field, the instruction processed before the write instruction executes; means for storing the instruction in an entry in a queue; means for storing in the entry the current value of the register field; means for searching the queue for the entry after the write instruction executes; and means for comparing the current value stored in the entry with the configuration value after the write instruction executes.

In another embodiment, a non-transitory computer-readable medium has instructions stored thereon which cause a controller, when executing the instructions to perform a method comprising: processing an instruction within a context determined by a current value of a register field, the instruction dependent upon a write instruction, the write instruction to write a configuration value to the register field, the instruction processed before the write instruction executes; storing the instruction in an entry in a queue; storing in the entry the current value of the register field; searching the queue for the entry after the write instruction executes; and comparing the current value stored in the entry with the configuration value after the write instruction executes.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
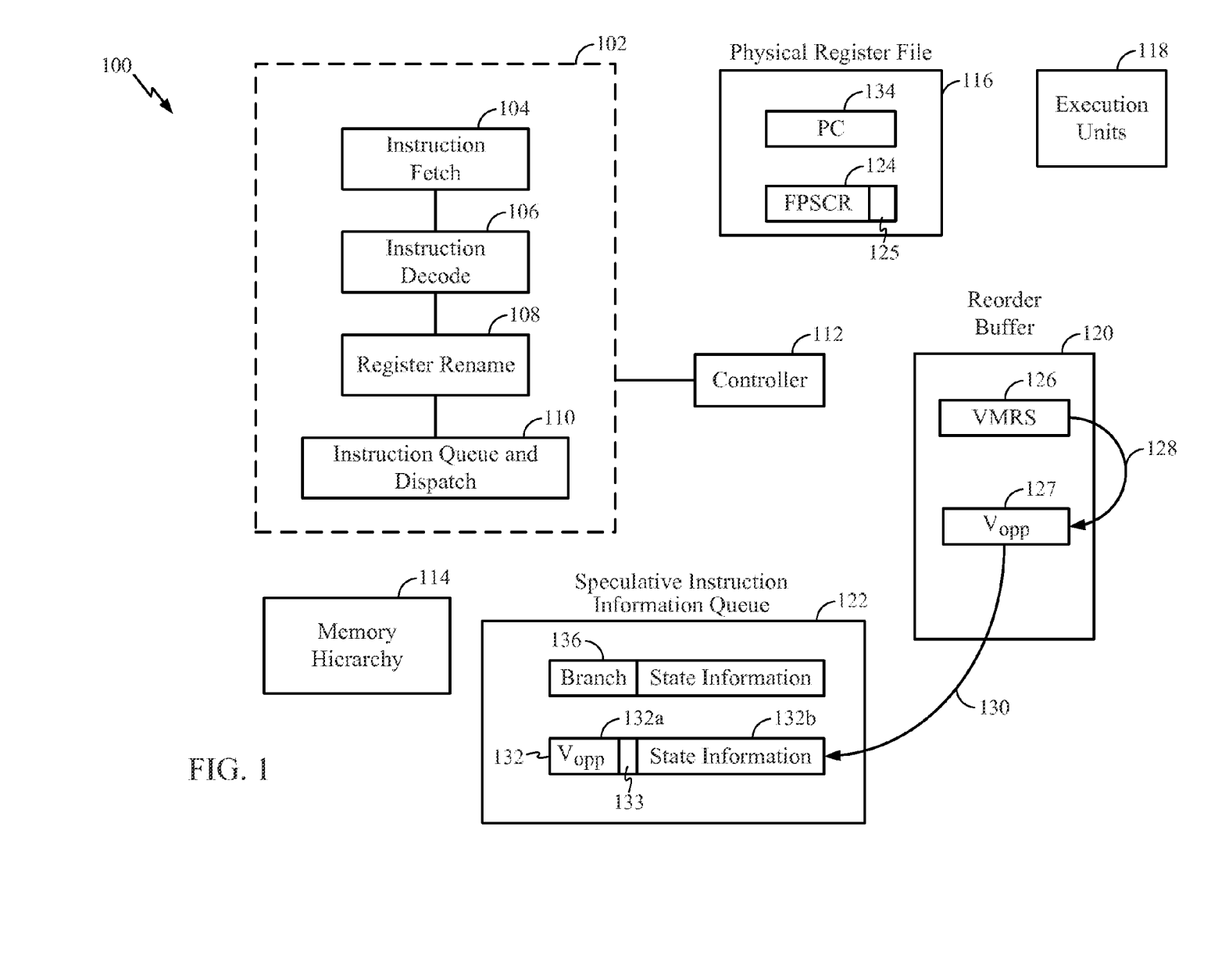
FIG. 1 is an abstraction of a processor according to an embodiment.

To facilitate in describing the embodiment, reference is first made to an abstraction of a processor 100 illustrated in FIG. 1, where for simplicity not all functional units conventionally found in a processor are shown. The processor 100 in which embodiments find applications may have a superscalar, out-of-order architecture, although this is not a requirement. However, it is assumed that the processor 100 illustrated in FIG. 1 has the capability to speculatively execute or process instructions, and to properly recover if a speculative execution or processing is found to be incorrect. For example, many processors have the capability to speculatively execute a branch instruction by predicting the target address of the branch instruction, and to properly recover and execute the correct instruction flow if the predicted target address is found later to be incorrect.

Shown in FIG. 1 is a pipeline 102 comprising an instruction fetch stage 104, an instruction decode stage 106, a register rename stage 108, and an instruction queue and dispatch stage 110. In practice, there may be more stages in a pipeline, such as for example various stages for writing results to memory locations or architected registers when an instruction commits (retires), but for simplicity only four stages are illustrated in the pipeline 102. A controller 112 controls the actions in the pipeline 102. (Here, the terms commit and retire are used as synonyms, so to say that an instruction commits may also be taken to mean that the instruction retires.)

Instructions and data are retrieved from and written to memory storage, comprising various caches and off-chip memory that may be considered part of a memory hierarchy. A functional block labeled 114 abstracts this memory hierarchy, and for ease of discussion one or more memory functional units may simply be referred to as the memory hierarchy 114. Some of the memory making up the memory hierarchy 114 may be integrated with the controller 112 or other functional units, and may be referred to as non-transitory computer-readable storage media. For some embodiments, the memory hierarchy 114 may include stored instructions by which the controller 112 or other functional units may carry out various actions as described herein.

Other functional units illustrated in FIG. 1 are a physical register file 116, a set of execution units 118, and a reorder buffer 120. The reorder buffer 120 facilitates out-of-order execution and for some embodiments may be implemented as a circular buffer, where instructions enter the buffer when they enter the instruction queue and dispatch stage 110, and exit the reorder buffer 120 when they commit (retire). The instructions commit in the order in which they enter the reorder buffer 120.

Another buffer, labeled as the speculative instruction information queue (SIIQ) 122, is used to store instructions that are processed early in the pipeline 102 within a speculatively predicted context, along with various register values and perhaps state information that may be needed to restore the state of the processor 100 if an in-flight instruction that was speculatively processed is later found not to be part of the correct instruction flow, and therefore should not commit. This buffer is referred to as a speculative instruction information queue and is discussed in more detail later.

Vector processing is an important capability in many signal processing applications, such as voice or image processing. A vector processing instruction is sometimes referred to as a SIMD (Single Instruction Multiple Data) instruction, where a single instruction operates on multiple data. A vector may be considered a range of memory locations with a constant stride between consecutive elements. In another view, a vector may be considered a range of register locations with a constant stride between consecutive elements. For example, for an array of physical registers $\{R_i, i=0, 1, 2, \ldots, 15\}$, a vector may consist of the register locations $R\{(i), i=0, 2, 4, \ldots, 14\}$ where the stride is two.

In a load-store architected processor, the elements of a vector are loaded into registers with a load instruction before being operated on according to a vector instruction. For example, a vector add instruction may add the values in a first set of source registers to the values in a second set of source registers and write the results to a set of destination registers. As a specific example, the values in a first set of source registers $\{RX(i) \ i=0, 1, 2, 3\}$ may be added to the values in a second set of source registers $\{RY(i) \ i=0, 1, 2, 3\}$ with the results written into a set of destination registers $\{RZ(i) \ i=0, 1, 2, 3\}$, where for each $i=0, 1, 2, 3$, the value of register $RZ(i)$ is the sum of the values in registers $RX(i)$ and $RY(i)$. In this specific example, the length of the vector is four and the stride is one.

The source register and destination register files utilized in vector processing may be viewed as physical registers encompassed by the functional unit 116, or as other physical register files not explicitly shown in FIG. 1.

The vector length, stride, and various other parameters consumed by vector instructions are stored in one or more control registers. An example of such a control register is labeled 124 in FIG. 1, and referred to as the FPSCR (Floating Point Status and Control Register) 124. An instruction to write (copy) the parameters to the FPSCR 124 is inserted in a block of code before (in program order) the vector instructions that rely upon the needed parameters. There is then a dependency of these vector instructions upon the write instruction to the FPSCR 124.

In particular, some instruction sets for a vector capable processor include a write instruction that writes to one or more fields in the FPSCR 124 that configure the behavior of vector instructions based upon the values in these fields. Stride or length fields are exemplary fields that may be included in the FPSCR 124, but other fields may also be included. These one or more fields are labeled 125 in FIG. 1. For ease of discussion, and without loss of generality, we refer to 125 as a field, although it may span more than one bit, and more than one field of the FPSCR 124.

For example, a non-zero value written to the field 125 may define a context in which vector instruction execution is an undefined instruction, resulting in the processor 100 executing an interrupt handler if a vector instruction execution is attempted. For some embodiments, only a proper subset of the set of vector instructions becomes undefined if the field 125 is set to a non-zero value. That is, for some embodiments there may be some vector instructions that ignore the field 125 in the FPSCR 124.

For ease of discussion, a write instruction will refer to an instruction that writes to the field 125 in the FPSCR 124, and the field 125 is referred to as a configuration field or a configuration value.

It may happen that when a write instruction and a dependent instruction such as a vector instruction are both in the pipeline 102, the operands for the vector instruction are available before the write instruction can write to the configuration field 125. For example, the value that the write instruction is to write to the configuration field 125 may be the result of another instruction that has not yet completed execution when the dependent vector instruction is ready to execute. To avoid a dependency hazard, some prior art processors may implement context synchronizing whereby all vector instructions subsequent (in program order) to the write instruction are not executed until the write instruction commits. Some other prior art processors may introduce a hold when decoding a vector instruction until all prior (in program order) write instructions have committed. However, such methods may degrade performance and cause pipeline bubbles.

To improve performance, embodiments perform speculative processing and execution of dependent instructions. In this embodiment, the dependent instructions are vector instructions but those having skill in the art will understand that other types of dependent instructions are within the scope of the present disclosure, including but not limited to instructions with a configurable privilege or security dependency or instructions that access particular architectural registers. More particularly, embodiments begin processing a vector instruction within a context determined by the current values of the FPSCR 124. If a write instruction has not yet committed and is in flight, but a later (in program order) dependent vector instruction is available to begin processing, then that dependent vector instruction is processed based upon the present state of the FPSCR 124 at its time of processing.

When a vector instruction dependent upon a write instruction is processed, it may happen that the present context of the FPSCR 124 (i.e., the value of the configuration field 125) at the time of processing the vector instruction is not the correct context. For example, it may be that the present context is such that the vector instruction is processed as undefined, but the vector instruction should in fact be processed as defined if the current context was correct. Alternatively, it may happen that the present context of the FPSCR 124 at the time of processing the vector instruction is such that the vector instruction is defined, and yet vector instruction should be undefined when processed in the correct context.

Accordingly, if it is determined that a vector instruction was processed in an incorrect context (context here referring to the value of the configuration field 125 when the pipeline 102 begins processing the vector instruction), then embodiments should perform a recovery procedure so that eventually the vector instruction will be processed and executed in the correct context.

To facilitate the recovery process, embodiments make use of the speculative instruction information queue 122. This queue may have the same structure as a branch instruction queue (BIQ), and for some embodiments the speculative instruction information queue 122 may be the BIQ itself, but where vector instructions are also queued in addition to branch instructions. For some embodiments state information, including but not limited to the address of the instruction Vopp 127 and any other non-context-dependent information required to resume execution at a desired fetch address, may also be included to help put the processor 100 into the correct state during a recovery process. Although the embodiments could be described by referring to the functional unit 122 as a BIQ, it is useful to use a different term so as not to limit the structure to a BIQ, and therefore the queue is referred to as a speculative instruction information queue.

In the example embodiment illustrated in FIG. 1, the instruction VMSR labeled 126 in the reorder buffer 120 denotes an instruction to write a value to the configuration field 125 in the FPSCR 124. (The VMSR terminology is taken from the ARM instruction set, where it can represent an instruction for transferring contents from the system register to the FPSCR. This terminology is borrowed merely for convenience, and the embodiments may find applications in many different architectures and instruction sets.) A subsequent instruction Vopp in the reorder buffer 120, labeled 127, denotes a vector instruction dependent upon the instruction VMSR 126. The arrow labeled 128 represents this dependency.

When the pipeline 102 begins processing the instruction Vopp 127, it is placed in the speculative instruction information queue 122. The arrow labeled 130 denotes the placement into the speculative instruction information queue 122, shown as an entry labeled 132. The entry 132 comprises two parts, the part labeled 132a includes the vector instruction and a context field 133, and the part labeled 132b includes state information. Some embodiments may not include the state information. For some embodiments that store the state information in an entry, such as for example the entry 132, the state information is used to return the processor 100 to a correct state during a recovery process when it is determined that a vector instruction was processed in an incorrect context. The context field 133 in the entry 132 indicates the context in which the associated instruction Vopp 127 for the entry 132 was processed. When a vector instruction associated with an entry commits or is flushed, then that entry is removed from the speculative instruction information queue 122.

At some point in time while a write instruction ("write" referring to a write to the FPSCR 124) is in flight, a determination is made as to whether any dependent vector instructions were processed in an incorrect context. For example, if there are no intervening write instructions between the instruction VMSR 126 and the instruction Vopp 127, then the instruction Vopp 127 may be dependent upon the instruction VMSR 126 and care should be taken to make sure that it was processed in the correct context before the instruction Vopp 127 retires.

For some embodiments, a determination for correct context is made when a write instruction commits. Continuing with the example illustrated in FIG. 1, when the instruction VMSR 126 is at the top (or head) of the reorder buffer 120 and is ready to commit, the value that the instruction VMSR 126 wrote to the configuration field 125 is compared with the context field for each entry in the speculative instruction information queue 122 having a dependent in-flight vector instruction. For example, the value of the context field 133 is compared with the value for the configuration field 125 that is resultant from the instruction VMSR 126 to determine whether the instruction Vopp 127 in the entry 132 was processed in the correct context. A vector instruction in the speculative instruction information queue 122 is dependent upon the instruction VMSR 126 if there are no intervening write instructions.

For some embodiments, for the case in which the instruction VMSR 126 is ready to commit but a dependent vector instruction in the speculative instruction information queue 122 is found to have been processed in an incorrect context, the instruction VMSR 126 is retired (which implies that all instructions ahead of the instruction VMSR 126 have also retired), all instructions are flushed from the pipeline and the reorder buffer 120, and the program counter 134 is loaded with the address of the instruction immediately subsequent in program order to the instruction VMSR 126. In this case, state information need not be stored in the speculative instruction information queue 122 because all of the architected registers are in the correct state when the instruction VMSR 126 retires and program control begins with the next in-order instruction.

Some embodiments may not wait for the instruction VMSR 126 to reach the top of the reorder buffer 120 before searching the speculative instruction information queue 122 for dependent vector instructions that may have been processed in an incorrect context. For example, for some embodiments, when the instruction VMSR 126 executes (here, execution of the instruction VMSR 126 means that the value it is to write to the FPSCR 124 is known), the speculative instruction information queue 122 is searched for incorrectly processed dependent vector instructions even though the instruction VMSR 126 may not be ready to commit.

In another embodiment, when an instruction in the SIIQ 122 such as instruction Vopp 127 is ready to retire (for example, is either ready to commit or to take an undefined interrupt), the instruction Vopp 127 compares the context field 133 against the architectural context in the configuration field 125. If the context field 133 and the configuration field 125 match, the instruction Vopp 127 retires in a conventional manner. However, if the context field 133 and the configuration field 125 do not match, a recovery procedure is performed. For instance, the pipeline and reorder buffer are flushed of both the dependent instruction Vopp 127 and all instructions following the dependent instruction, and the program counter 134 is set to fetch dependent instruction Vopp 127, and state information 132*b* is used to restore the correct state.

In some embodiments, it may not be necessary to wait until instruction Vopp 127 is ready to retire to perform the described check. If there are no pending possible updates (whether by an instruction such as instruction VMSR 126 or otherwise) to the configuration field 125 prior to instruction Vopp 127 being ready to retire, the instruction Vopp 127 may compare the configuration field 125 with the context field 133 and perform the recovery procedure if necessary without waiting until instruction Vopp 127 is ready to retire.

The speculative instruction information queue 122 may also be used to store branch instructions and associated state information so that the processor 100 may recover from an incorrectly executed branch instruction. This is the reason for including the entry 136 in FIG. 1. (The entry 136 may comprise other information than state information, but for ease of discussion the entry 136 is not described in detail because it is well known in the art.) In this case, the speculative instruction information queue 122 includes the functionality of a BIQ, as discussed previously. However, embodiments may not include the functionality of a BIQ in the speculative instruction information queue 122, but may employ another physical buffer for the BIQ separate from the physical buffer used to implement the speculative instruction information queue 122.

Figure 2A:
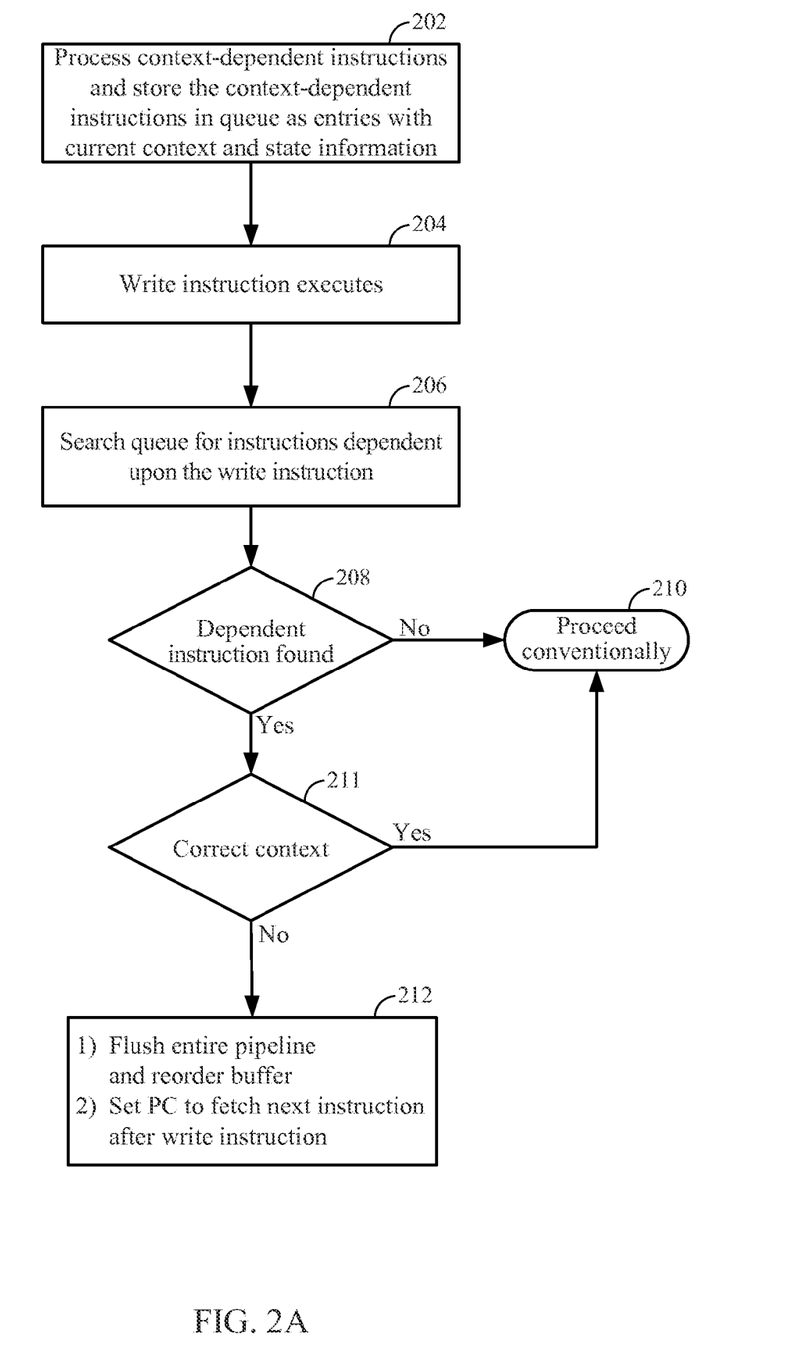
FIG. 2A illustrates a method of checking and repairing context according to an embodiment.

FIG. 2A illustrates a method employed by one or more embodiments discussed above. As indicated in box 202, context-dependent instructions (such as a vector instruction) are processed and are placed in the speculative instruction information queue 122. A context-dependent instruction is processed although a prior (in program order) write instruction has not executed, where the write instruction is an instruction that writes a value to the configuration field 125. The instruction is processed within the context determined by the value of the configuration field 125 at the time the instruction is processed.

An instruction is stored in the speculative instruction information queue 122 as part of an entry, where the entry also comprises a context field with a value equal to the value of the configuration field 125 when the instruction was processed.

After execution of a write instruction that writes to the configuration field 125 (box 204), the speculative instruction information queue 122 is searched for an entry having an instruction dependent upon that write instruction (box 206). This search may be performed before the write instruction is at the head of the reorder buffer 120, or it may be performed when the write instruction reaches the head of the reorder buffer 120 and commits.

If no such entry is found, then no special action is taken and the pipeline proceeds conventionally, as indicated in the determination 208 and the oval 210 in FIG. 2A. However, if an entry is found containing an instruction dependent upon the write instruction, then in the determination 211 the value of the context field 133 is compared with the configuration field value associated with the write instruction to determine if the instruction was processed in the correct context. If the instruction was processed in the correct context, then the process flow returns to the oval 210 to indicate that no special action is taken.

However, if the instruction was processed in an incorrect context, then various actions are taken for the processor 100 to properly recover from processing the instruction in the incorrect context, as indicated in the box 212. In the box 212, all in-flight instructions are flushed from the pipeline 102 and the reorder buffer 120, and the program counter 134 is set so that the instruction immediately following (in program order) the write instruction is fetched.

Figure 2B:
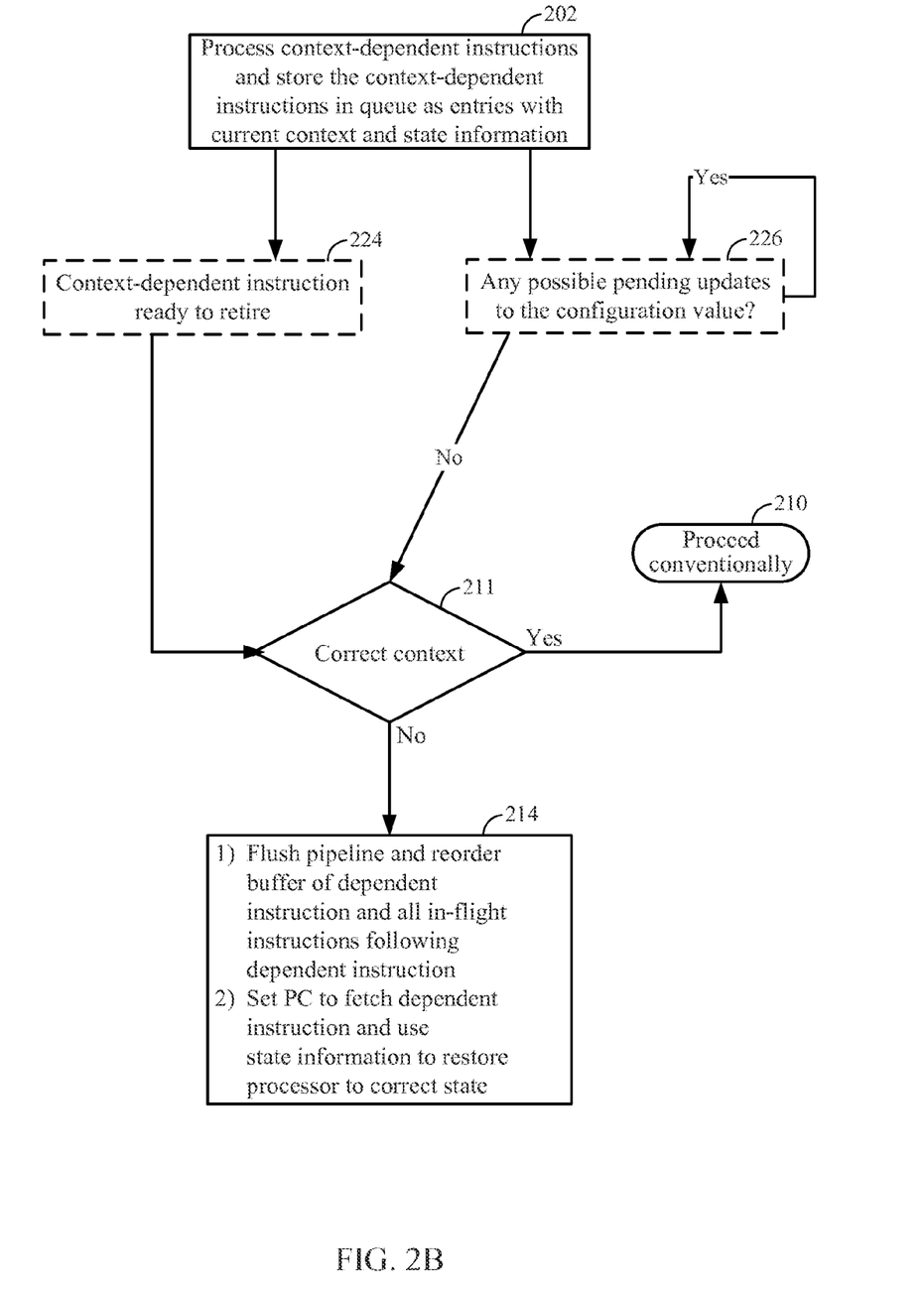
FIG. 2B illustrates a method of checking and repairing context according to another embodiment.

FIG. 2B illustrates a method employed by another of the embodiments discussed above. As indicated in box 202, context-dependent instructions (such as a vector instruction) are processed and are placed in the speculative instruction information queue 122. A context-dependent instruction is processed although a prior (in program order) write instruction has not executed, where the write instruction is an instruction that writes a value to the configuration field 125. The instruction is processed within the context determined by the value of the configuration field 125 at the time the instruction is processed.

An instruction is stored in the speculative instruction information queue 122 as part of an entry, where the entry also comprises a context field with a value equal to the value of the configuration field 125 when the instruction was processed.

The check for whether the context in which the context-dependent instruction was executed is correct may be performed in two different ways. In one embodiment in box 224, when the context-dependent instruction is ready to retire the method continues to box 211 to perform the check. In another embodiment, in box 226 the context-dependent instruction checks to determine whether there are any possible pending updates to the configuration value 125 (whether by an instruction such as instruction VMSR 126 or otherwise). If there are pending possible updates, the method returns to box 226 to wait. If there are no pending possible updates, the method continues to box 211 to perform the check.

In box 211, the value of the context field 133 is compared with the configuration field value associated with the write instruction to determine if the instruction was processed in the correct context. If the instruction was processed in the correct context, then the process flow returns to the oval 210 to indicate that no special action is taken.

However, if the instruction was processed in an incorrect context, then various actions are taken for the processor 100 to properly recover from processing the instruction in the incorrect context, as indicated in the box 214. In the box 214, the instruction and all in-flight instructions immediately following (in program order) the instruction are flushed from the pipeline 102 and the reorder buffer 120, and the program counter 134 is set so that the instruction is the next instruction to be fetched, and the state information stored in the entry with the instruction is used to restore the state of the processor 100 to the correct state for processing the instruction.

In some embodiments, the controller 112 may carry out the methods of FIG. 2A or 2B by executing firmware or instructions stored in a non-transitory computer-readable medium, such as the memory hierarchy 114.

Figure 3:
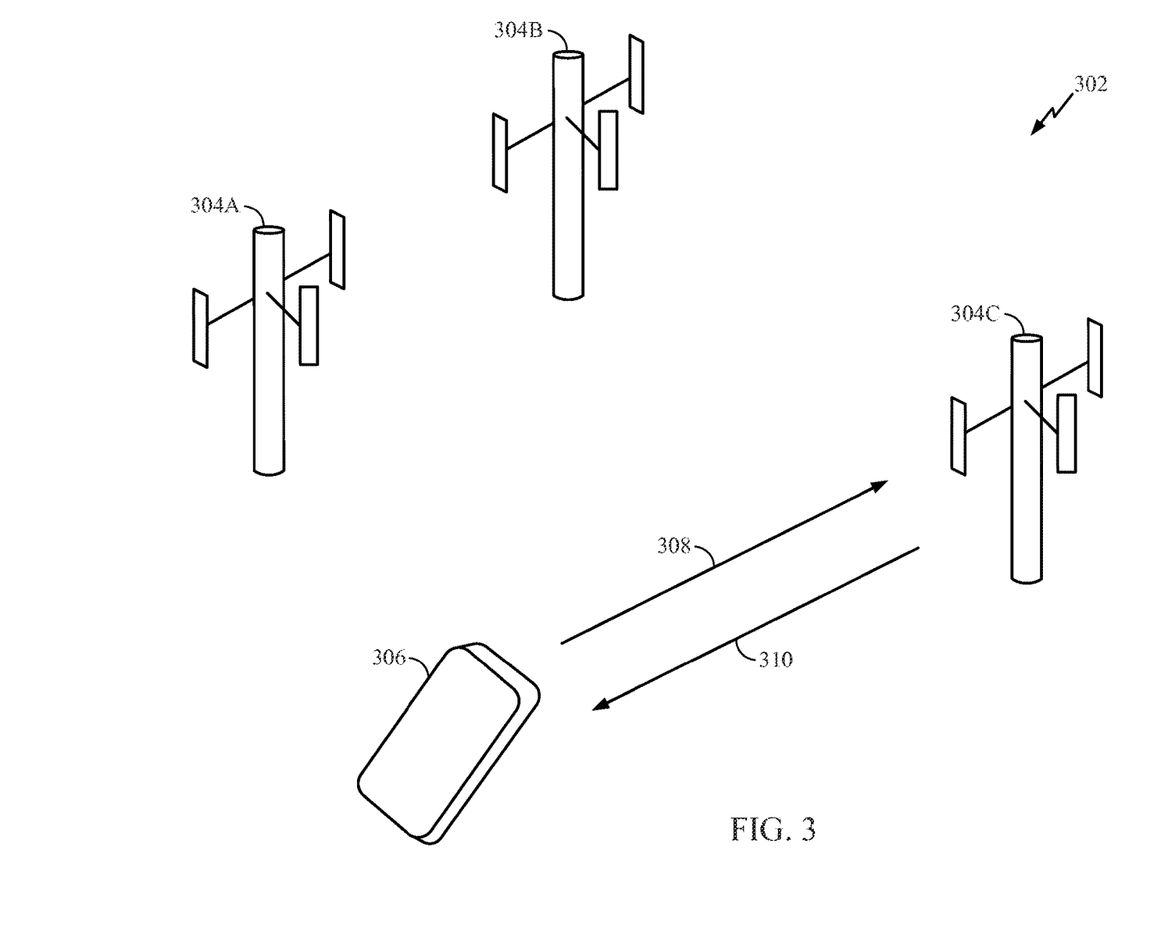
FIG. 3 illustrates a communication system in which embodiments may find application.

FIG. 3 illustrates a wireless communication system in which embodiments may find application. FIG. 3 illustrates a wireless communication network 302 comprising base stations 304A, 304B, and 304C. FIG. 3 shows a communication device, labeled 306, which may be a mobile cellular communication device such as a so-called smart phone, a tablet, or some other kind of communication device suitable for a cellular phone network, such as a computer or computer system. The communication device 306 need not be mobile. In the particular example of FIG. 3, the communication device 306 is located within the cell associated with the base station 304C. Arrows 308 and 310 pictorially represent the uplink channel and the downlink channel, respectively, by which the communication device 306 communicates with the base station 304C.

Embodiments may be used in data processing systems associated with the communication device 306, or with the base station 304C, or both, for example. FIG. 3 illustrates only one application among many in which the embodiments described herein may be employed Embodiments have been described in the context of vector instructions and their dependency upon one or more fields in the FPSCR 124. However, embodiments are not limited to vector instructions, and may find application to other types of instructions that depend upon one or more fields in a register for their context. For example, embodiments may find application in processor architectures in which there may be a large span in the pipeline between the generation of a resource and its dependent consumption, relatively rare updates to the dependency-generating state, and high performance demands for dependency-consuming instructions. As such, the embodiments described may be viewed as a type of prediction scheme, where a state defining the context of the dependent instruction is predicted not to change between the time that the state is consumed by the dependent instruction and the time that the dependent instruction commits. Changes to the state then cause a misprediction. This is similar to but distinct from branch prediction techniques, in that the dependency does not involve either conditionality or a target, and involves non-branch instructions.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method as described above. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
   processing an instruction having a behavior based upon a configuration value of a register field, the instruction dependent upon a write instruction prior in program order to the instruction, the write instruction to write the configuration value to the register field, the instruction processed before the write instruction executes within a context based upon a current value of the register field at the time the instruction is processed;
   storing the instruction in an entry in a queue;
   storing in the entry the current value of the register field;
   searching the queue for the entry after the write instruction executes; and
   comparing the current value stored in the entry with the configuration value after the write instruction executes.

2. The method of claim 1, further comprising:
   provided the current value stored in the entry does not match the configuration value, flushing a pipeline of all in-flight instructions, and setting a program counter to an address of a next instruction in program order after the write instruction.

3. The method of claim 2, processing the instruction further comprising:
processing the instruction as defined if the current value is a first value; and
processing the instruction as undefined if the current value is not the first value.

4. The method of claim 1, further comprising:
provided the current value stored in the entry does not match the configuration value, flushing a pipeline of the instruction and all in-flight instructions following the instruction in program order, and setting a program counter to an address of the instruction.

5. The method of claim 4, further comprising:
storing in the entry a state information of a processor, the state information at a time when the instruction is processed; and
provided the current value stored in the entry does not match the configuration value, retrieving the state information from the entry, and restoring the processor to a state indicated by the state information.

6. The method of claim 1, wherein the instruction is a vector instruction.

7. The method of claim 1, wherein the register field comprises one or more fields.

8. The method of claim 1, processing the instruction further comprising:
processing the instruction as defined if the current value is a first value; and
processing the instruction as undefined if the current value is not the first value.

9. The method of claim 1, further comprising:
removing the entry from the queue when the instruction commits.

10. A processor comprising:
a register having a field;
a queue;
a pipeline;
a controller configured to:
cause the pipeline to process an instruction within a context determined by a current value of the register field at the time the instruction is processed, the instruction having a behavior based upon a configuration value of the register field, the instruction processed before the pipeline executes a write instruction prior in program order to the instruction, the instruction dependent upon the write instruction, the write instruction to write the configuration value to the register field;
store the instruction in an entry in the queue;
store in the entry the current value of the register field;
search the queue for the entry after the pipeline executes the write instruction; and
compare the current value stored in the entry with the configuration value after the pipeline executes the write instruction.

11. The processor of claim 10, further comprising:
a program counter;
the controller further configured to, provided the current value stored in the entry does not match the configuration value:
flush the pipeline of all in-flight instructions; and
set the program counter to an address of a next instruction in program order after the write instruction.

12. The processor of claim 11, the controller further configured to cause the pipeline to:
execute the instruction as defined if the current value is a first value; and
execute the instruction as undefined if the current value is not the first value.

13. The processor of claim 10, further comprising a program counter, the controller configured to, provided the current value stored in the entry does not match the configuration value:
flush the pipeline of the instruction and all in-flight instructions following in program order the instruction; and
set the program counter to an address of the instruction.

14. The processor of claim 13, the controller configured to:
store in the entry a state information of the processor, the state information at a time when the pipeline processes the instruction;
provided the current value stored in the entry does not match the configuration value, retrieve the state information from the entry, and restore the processor to a state indicated by the state information.

15. The processor of claim 13, the controller configured to cause the pipeline to:
execute the instruction as defined if the current value is a first value; and
execute the instruction as undefined if the current value is not the first value.

16. The processor of claim 10, the controller configured to cause the pipeline to:
execute the instruction as defined if the current value is a first value; and
execute the instruction as undefined if the current value is not the first value.

17. The processor of claim 10, the controller configured to remove the entry from the queue when the pipeline commits the instruction.

18. The processor of claim 10, wherein the instruction is a vector instruction.

19. The processor of claim 10, wherein the register field comprises one or more fields.

20. A processor comprising:
means for processing an instruction within a context determined by a current value of a register field at the time the instruction is processed, the instruction having a behavior based upon a configuration value of the register field, the instruction dependent upon a write instruction prior in program order to the instruction, the write instruction to write the configuration value to the register field, the instruction processed before the write instruction executes;
means for storing the instruction in an entry in a queue;
means for storing in the entry the current value of the register field;
means for searching the queue for the entry after the write instruction executes; and
means for comparing the current value stored in the entry with the configuration value after the write instruction executes.

21. The processor of claim 20, further comprising:
provided the current value stored in the entry does not match the configuration value, means for flushing a pipeline of all in-flight instructions, and means for setting a program counter to an address of a next instruction in program order after the write instruction.

22. The processor of claim 20, further comprising:
provided the current value stored in the entry does not match the configuration value, means for flushing a pipeline of the instruction and all in-flight instructions following in program order the instruction, and means for setting the program counter to an address of the instruction.

23. The processor of claim 20, the register field comprising one or more fields.

24. The processor of claim 20, wherein the instruction is a vector instruction.

25. A non-transitory computer-readable medium having instructions stored thereon to cause a controller to perform a method comprising:
processing an instruction within a context determined by a current value of a register field at the time the instruction is processed, the instruction having a behavior based upon a configuration value of the register field, the instruction dependent upon a write instruction prior in program order to the instruction, the write instruction to write the configuration value to the register field, the instruction processed before the write instruction executes;
storing the instruction in an entry in a queue;
storing in the entry the current value of the register field;
searching the queue for the entry after the write instruction executes; and
comparing the current value stored in the entry with the configuration value after the write instruction executes.

26. The non-transitory computer-readable medium of claim 25, the method further comprising:
provided the current value stored in the entry does not match the configuration value, flushing a pipeline of all in-flight instructions, and setting a program counter to an address of a next instruction in program order after the write instruction.

27. The non-transitory computer-readable medium of claim 25, the method further comprising:
provided the current value stored in the entry does not match the configuration value, flushing a pipeline of the instruction and all in-flight instructions following in program order the instruction, and setting the program counter to an address of the instruction.

28. The non-transitory computer-readable medium of claim 27, the method further comprising:
storing in the entry a state information of a processor, the state information at a time when the instruction is processed; and
provided the current value stored in the entry does not match the configuration value, retrieving the state information from the entry, and restoring the processor to a state indicated by the state information.

29. The non-transitory computer-readable medium of claim 25, processing the instruction further comprising:
processing the instruction as defined if the current value is a first value; and
processing the instruction as undefined if the current value is not the first value.

30. The non-transitory computer-readable medium of claim 25, the method further comprising:
removing the entry from the queue when the instruction commits.

31. The non-transitory computer-readable medium of claim 25, the register field comprising one or more fields.

32. The non-transitory computer-readable medium of claim 25, wherein the instruction is a vector instruction.

* * * * *